(12) United States Patent
Womble et al.

(10) Patent No.: US 10,717,653 B2
(45) Date of Patent: Jul. 21, 2020

(54) GRAPHENE PRODUCTION BY THE THERMAL RELEASE OF INTRINSIC CARBON

(71) Applicant: VAON, LLC, Bowling Green, KY (US)

(72) Inventors: Phillip C. Womble, Bowling Green, KY (US); Henry Steen, Bowling Green, KY (US); Melinda Whitfield Thomas, Bowling Green, KY (US); Jonathan C. Paschal, Bowling Green, KY (US); Quentin Lineberry, Bowling Green, KY (US); Richard C. Pape, Bowling Green, KY (US)

(73) Assignee: Vaon, LLC, Bowling Green, KY (US)

( * ) Notice: Subject to any disclaimer, the term of this patent is extended or adjusted under 35 U.S.C. 154(b) by 53 days.

(21) Appl. No.: 16/181,646

(22) Filed: Nov. 6, 2018

(65) Prior Publication Data

US 2019/0135635 A1  May 9, 2019

Related U.S. Application Data

(60) Provisional application No. 62/583,114, filed on Nov. 8, 2017.

(51) Int. Cl.
| | | |
|---|---|---|
| *C23C 16/26* | (2006.01) | |
| *C01B 32/184* | (2017.01) | |
| *B82Y 30/00* | (2011.01) | |
| *B82Y 40/00* | (2011.01) | |

(52) U.S. Cl.
CPC ............ *C01B 32/184* (2017.08); *B82Y 30/00* (2013.01); *B82Y 40/00* (2013.01)

(58) Field of Classification Search
CPC ...... C23C 16/26; C01B 32/184; C01B 32/186
See application file for complete search history.

(56) References Cited

U.S. PATENT DOCUMENTS

| | | | | |
|---|---|---|---|---|
| 2010/0137970 A1* | 6/2010 | Srivastava | ............ | A61L 31/022 623/1.15 |
| 2012/0012796 A1* | 1/2012 | Chen | ........................ | C09D 7/62 252/502 |
| 2013/0233480 A1* | 9/2013 | Na | ........................ | B32B 37/025 156/249 |
| 2013/0287956 A1* | 10/2013 | Patil | ........................ | B01J 37/34 427/333 |
| 2014/0175458 A1* | 6/2014 | Ahn | .................. | H01L 21/02378 257/77 |
| 2014/0234200 A1* | 8/2014 | Tour | ........................ | C01B 32/194 423/448 |
| 2014/0363363 A1* | 12/2014 | Naritsuka | ................ | B01J 37/08 423/448 |
| 2015/0060758 A1* | 3/2015 | Lee | ........................ | H01J 1/3046 257/10 |
| 2015/0121837 A1* | 5/2015 | Kinloch | .................. | C30B 29/04 59/88 |
| 2015/0210552 A1* | 7/2015 | Rieken | .................. | B82Y 30/00 423/448 |
| 2015/0266744 A1* | 9/2015 | Raynor | .................... | B01J 19/02 423/292 |
| 2015/0294907 A1* | 10/2015 | Kim | .................... | H01L 51/0045 438/610 |
| 2016/0005894 A1* | 1/2016 | Zhang | .................... | B82Y 40/00 257/29 |
| 2016/0340797 A1* | 11/2016 | Ozyilmaz | ................. | C30B 1/02 |
| 2017/0081782 A1* | 3/2017 | Yoon | ..................... | C30B 25/186 |
| 2019/0074142 A1* | 3/2019 | Gartia | ..................... | C30B 33/02 |

OTHER PUBLICATIONS

Braeuninger-Weimer, Philipp, et al., "Understanding and Controlling Cu-Catalyzed Graphene Nucleation: The Role of Impurities, Roughness, and Oxygen Scavenging". Chem. Mater. 2016, 28, 8905-8915.*

Zhang, Xiuyun, et al., "Role of Hydrogen in Graphene Chemical Vapor Deposition Growth on a Copper Surface". J. Am. Chem. Soc. 2014, 136, 3040-3047.*

Kamali, Ali Reza, et al., "Large-scale preparation of graphene by high temperature insertion of hydrogen into graphite". Nanoscale, 2015, 7, 11310-11320.*

Qiu, Yang, et al., "Antioxidant chemistry of graphene-based materials and its role in oxidation protection technology". Nanoscale, 2014, 6, 11744-11755.*

* cited by examiner

*Primary Examiner* — Bret P Chen
(74) *Attorney, Agent, or Firm* — 21st Century IP, LLC; Kelly Hollowell

(57) ABSTRACT

The present invention generally relates to a process for manufacturing graphene coated surfaces using the intrinsic carbon within a metal.

18 Claims, 6 Drawing Sheets

GRAPHENE PRODUCTION BY THE THERMAL RELEASE OF INTRINSIC CARBON

FIELD OF THE INVENTION

The present invention generally relates to a process for manufacturing graphene coated surfaces using the intrinsic carbon from a carbon-containing metal, the graphene-coated metals, and uses of the graphene coated metals.

BACKGROUND OF THE INVENTION

There is a current focus on fabricating graphene using processes that can lead to large-scale production. The techniques can initially be divided into 1) separating graphene from graphite and other carbon compounds or 2) synthesizing graphene using precursor chemicals.

One method of synthesis which has promise for industrial-scale production is chemical vapor deposition (CVD). In CVD, precursor chemicals, such as methane gas, are introduced onto a substrate which acts as a catalytic material, such as copper, in an environment, such as a tube furnace at high temperature, and the resulting reaction produces graphene upon the substrate. The CVD method, while useful, still has a number of drawbacks, including the difficulty of initiating graphene growth.

In view of the above, it would be advantageous to discover new ways of growing graphene.

SUMMARY OF THE INVENTION

In an aspect, the present invention provides a novel method of growing graphene on a carbon-containing metal.

In another aspect, the present invention provides a novel method of growing graphene on a substrate in the presence of a carbon-containing metal.

These and other aspects, which will become apparent during the following detailed description, have been achieved by the inventors' discovery of graphene formation on and from carbon-containing metals.

DETAILED DESCRIPTION OF THE PREFERRED ASPECTS

In an aspect, the present invention provides a novel method of forming graphene, comprising:
 a. applying a vacuum to a furnace, the inside of the furnace comprising:
   (i) an oxygen scavenger; and,
   (ii) a growth sample, the growth sample, comprising: a carbon-containing metal;
 b. introducing a hydrogen-containing gas to the furnace;
 c. heating the inside of the furnace to a temperature and for a time sufficient to initiate graphene formation on the carbon-containing metal; and,
 d. cooling the furnace.

Figure 1:
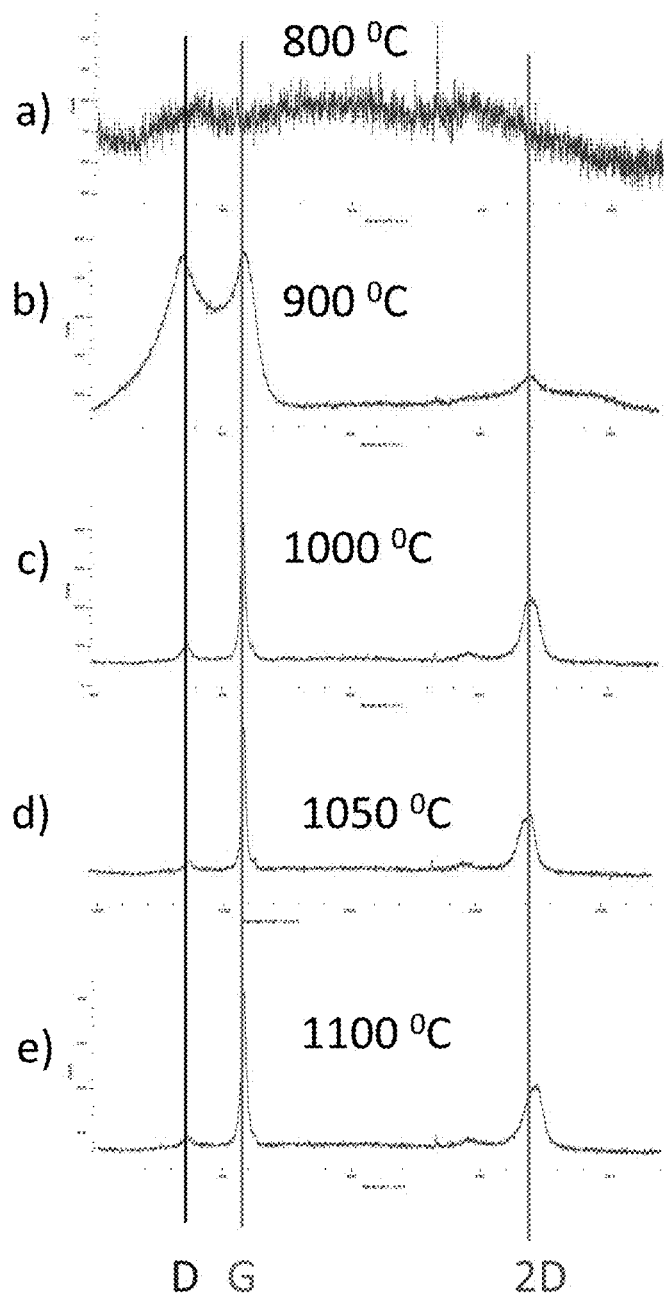
FIG. 1 shows observed Raman peaks.

FIG. 1 shows the "tell-tale" graphene Raman peaks of D (1350 cm$^{-1}$), G (1585 cm$^{-1}$) and 2D (2700 cm$^{-1}$) that were observed when carbon steel was heated from 800-1100° C.

Figure 2:
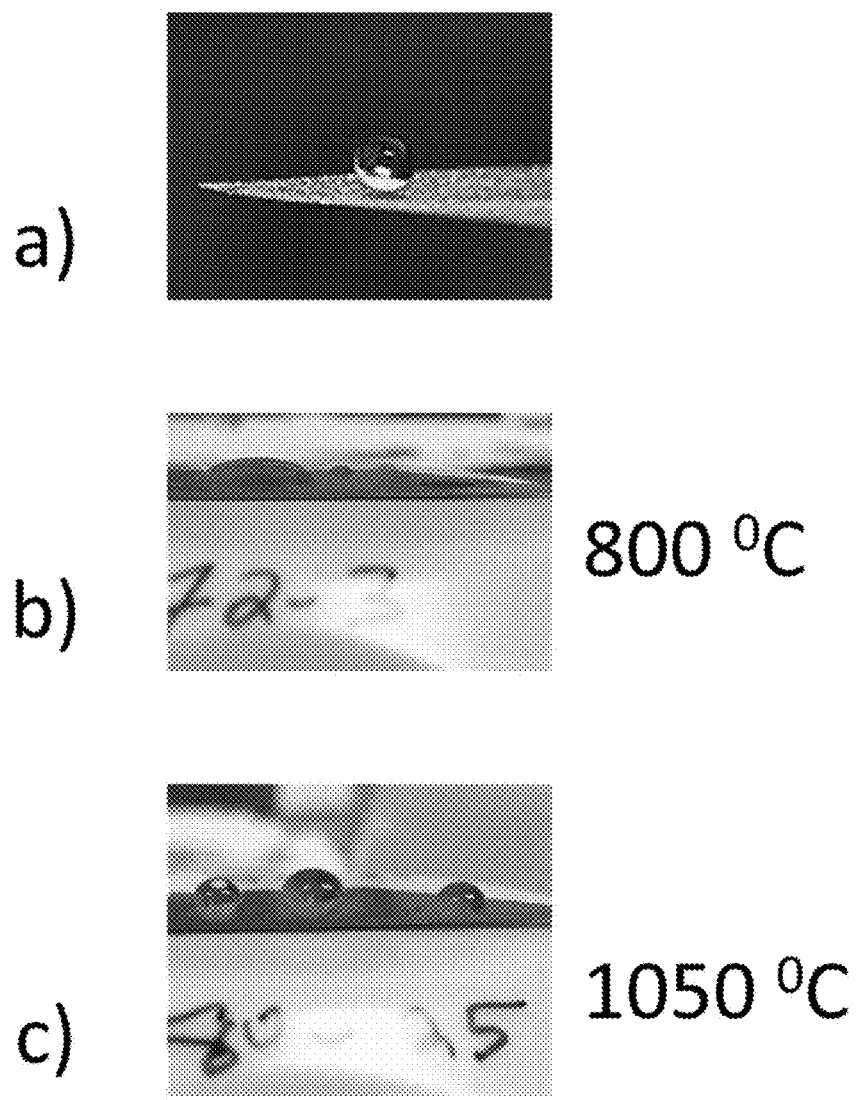
FIG. 2 shows a comparison of hydrophobic activity.

FIG. 2 compares the hydrophobic activity of a leaf (a) with carbon steel heated to 800° C. (b) and 1050° C. (c).

Figure 3:
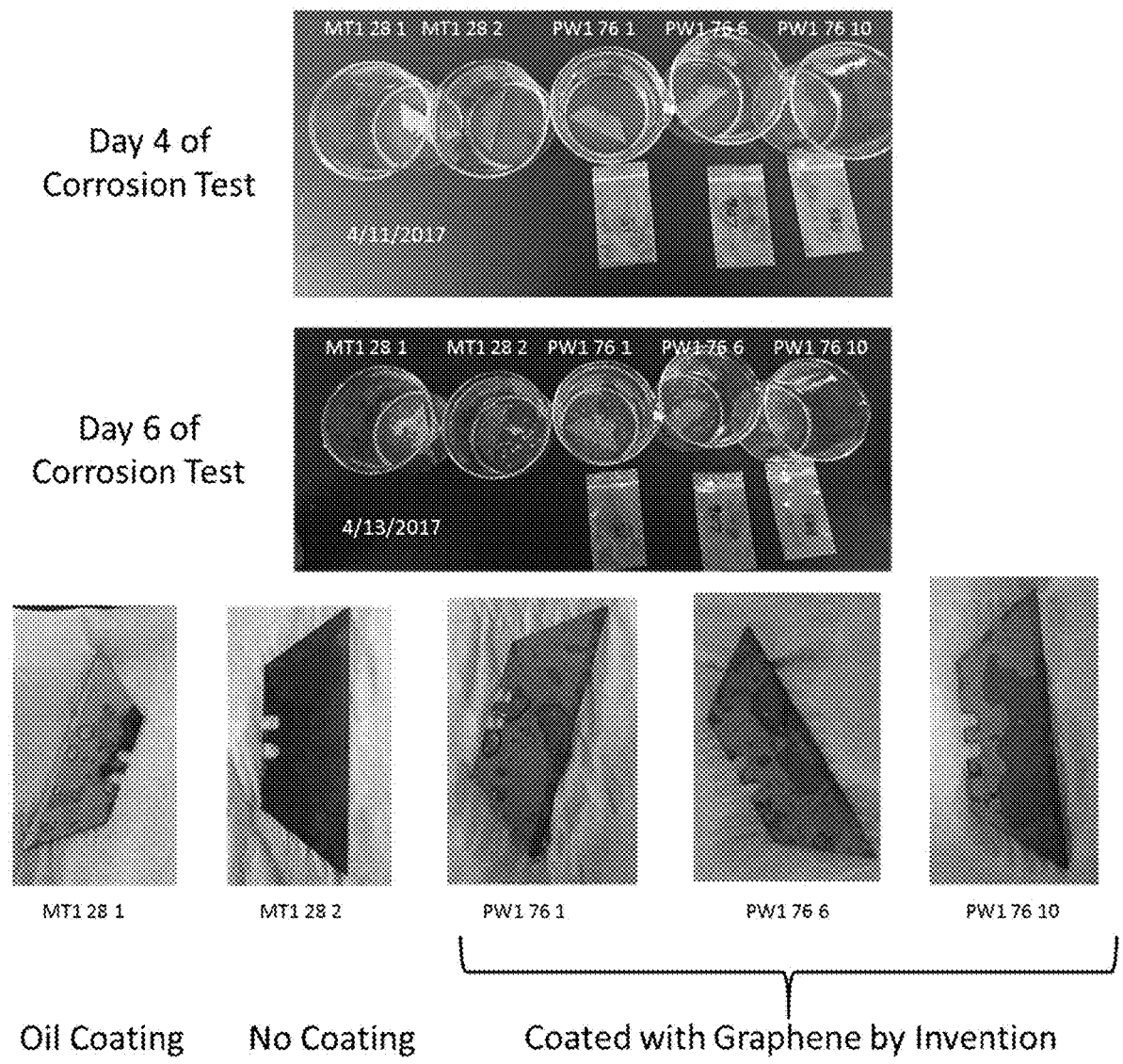
FIG. 3 shows the results of a corrosion test.

FIG. 3 shows the results of a corrosion test on samples with an oil coating, no coating, or graphene coating.

Figure 4:
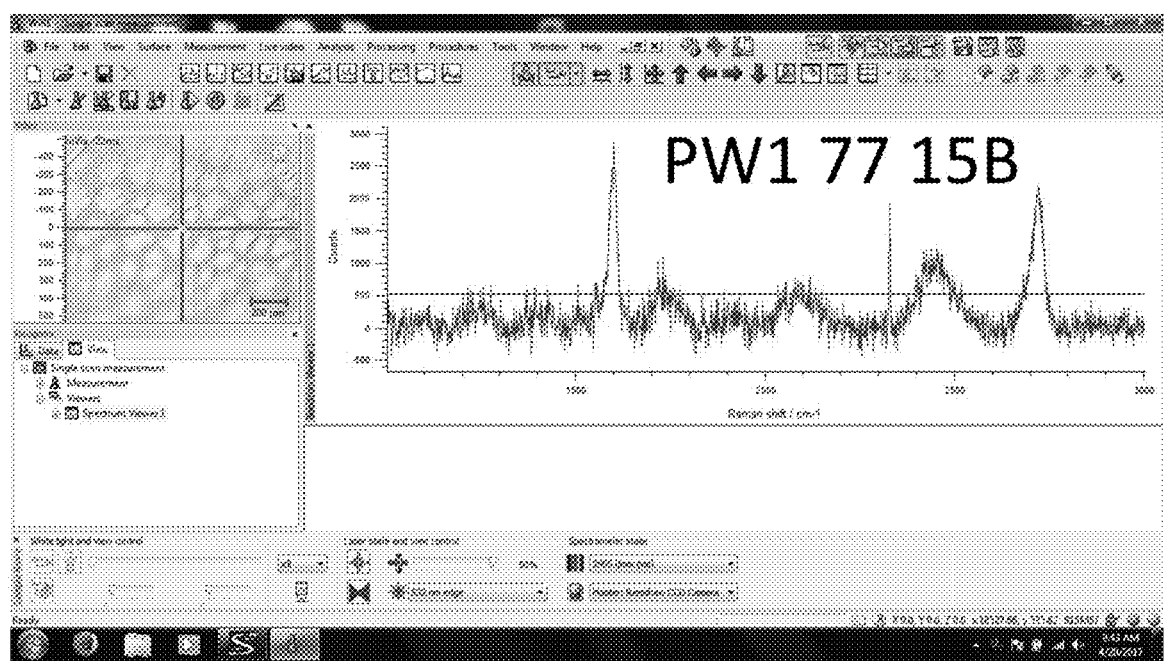
FIG. 4 shows Raman spectrum from the growth medium.

FIG. 4 shows the Raman spectrum of the flower-like patterns seen upon the growth medium.

Figure 5:
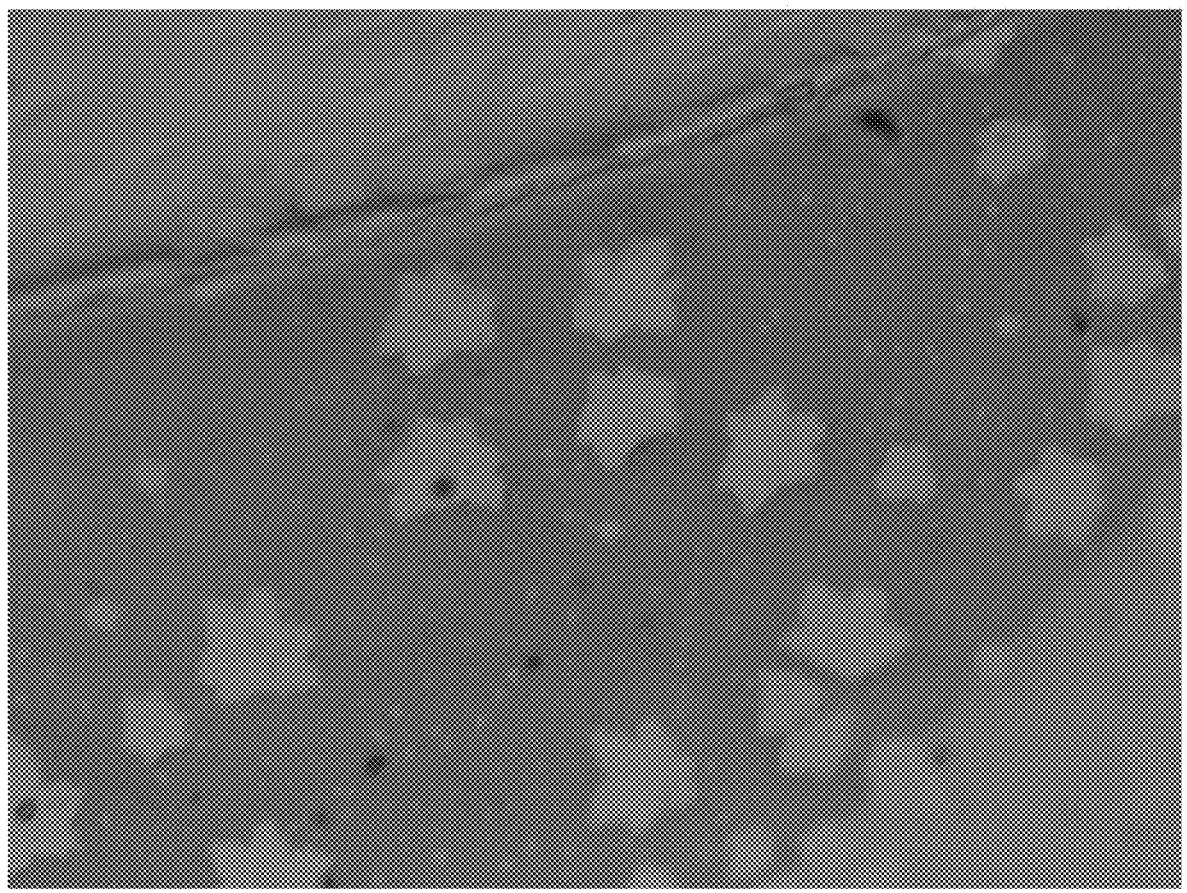
FIG. 5 shows a magnified view of graphene.

FIG. 5 shows a magnified view of the "flower like" patterns of graphene. Each graphene domain is approximately 35 µm.

Figure 6:
FIG. 6 shows a close-up view of a graphene domain.

FIG. 6 shows a close-up view of a graphene domain. The object is approximately 35 µm in diameter.

In another aspect, the growth sample, further comprises: a substrate, wherein the carbon-containing metal is in the form of a plurality of seeds that are in contact with the substrate.

In another aspect, when the growth sample comprises: seeds and a substrate, the process, further comprises:
 e. removing the seeds from the substrate.

All of the operations with the furnace refer to the inside of the furnace. For example, the growth sample and oxygen scavenger are located inside of the furnace. The vacuum is applied to the inside of the furnace. The gas is introduced to the inside of the furnace. The temperature refers to the temperature inside the furnace.

In another aspect, the furnace is a tube furnace.

A carbon-containing metal is a metal that solubilizes carbon. The carbon-containing metal contains intrinsic carbon within it. In another aspect, the carbon-containing metal, comprises: at least 1, 1.5, 2, 2.5, 3, 3.5, to 4% by weight of carbon. In another aspect, the carbon-containing metal is selected from Fe and Ni. Examples of carbon-containing metals include: carbon steel, 1095 steel, and grey steel.

In another aspect, the carbon-containing metal is in the form of a plurality of seeds whose size is on the order of 100 µm or less. These seeds are placed onto and in contact with a substrate. The seeds allow for graphene growth on the substrate.

Graphene refers to a layer of material, primarily comprising: graphene (a crystalline allotrope of carbon typically of a single atomic plane of graphite having a 2-dimensional hexagonal lattice structure of carbon atoms). The layer formed by the present invention is typically from 1, 2, 3, 4, 5, 6, 7, 8, 9, to 10 atomic layers in thickness.

A substrate is typically a metal, insulator, or combination thereof, on which graphene will grow. In another aspect, the substrate is selected from: Cu (metal), sapphire (insulator), and Ni on sapphire (metal on an insulator).

In another aspect, the oxygen scavenger is Ti (e.g., Ti sponge or Ti chips). The Ti is typically 99.9% pure and can range in size from 50 µm to 19 mm. The amount of oxygen scavenger can vary but typically there is about 70 cc for every liter of inner tube furnace volume.

In another aspect, the carbon-containing metal and the oxygen scavenger are located in separate containers (e.g., crucibles or boats) in the furnace.

In another aspect, the vacuum applied is ≤10 mTorr. Additional examples of the vacuum applied include 9, 8, 7, 6, 5, 4, 3, 2, 1, 0.9, 0.8, 0.7, 0.6, 0.5, 0.4, 0.3, 0.2, and 0.1 mTorr.

In another aspect, the hydrogen-containing gas is a forming gas. Examples of forming gases include 95% Ar/5% $H_2$ and 95% $N_2$/5% $H_2$.

In another aspect, the hydrogen-containing gas is introduced until the pressure of the furnace is from 20-150 mTorr. Examples of the pressure of the furnace after introducing the hydrogen-containing gas includes from 30-120 mTorr and 40-100 mTorr. Additional examples include 20, 30, 40, 50, 60, 70, 80, 90, 100, 110, 120, 130, 140, to 150 mTorr.

In another aspect, the furnace is heated to a temperature of from 900, 950, 1000, 1050, to 1100° C.

In another aspect, the furnace is held at its final temperature for an hour. Examples of the time the furnace is held at its final temperature also include: 30, 40, 50, 60, 70, 80, 90, 100, 110, to 120 minutes.

The furnace is heated to a temperature and for a time sufficient to initiate graphene formation on the carbon-containing metal. If a substrate is present, the graphene formation occurs on the substrate.

In another aspect, the furnace is heated at a rate of 20° C./min until the desired temperature is achieved.

In another aspect, the cooling is conducted naturally. Natural cooling refers to turning off the power to the furnace and letting the heat dissipate without further assistance.

The graphene-coated (or substantially coated) substances of the present invention have numerous potential applications. Examples of these potential applications include:
1. Corrosion resistance for applications using carbon steel
2. Electronic components which use graphene including, but not limited to, printed circuit board (PCB) traces, PCB components such as capacitors and inductors, and other PCB components.
3. Replacement arthroplasty using graphene as a barrier between the joint replacement material and the body.
4. Molecular sieves including water treatment filters.
5. Coefficient of friction reduction for carbon steels.
6. Surface energy modification (hydrophobicity).
7. Enhanced sensor elements.
8. Augmentation of chromatography columns.

EXAMPLES

The following examples are meant to illustrate, not limit, the present invention.

Example 1: General Procedure for Graphene Growth on a Carbon-Containing Metal

A carbon-containing metal is placed in a high temperature, extremely anaerobic atmosphere to grow graphene.

The sample (carbon-containing metal containing intrinsic C, e.g., Fe containing at least 1% by weight of C) is placed into the central heating zone of a tube furnace along with sufficient quantity (~70 cc for every liter of inner tube furnace volume) of Ti sponge (99.9% with top size of 19 mm and minimum size below 3 mm). Care is taken to ensure that there is a small space in the furnace between the Ti sponge and sample. Typically, the sample and the Ti are in different crucibles or boats. A vacuum is then applied. When the pressure in the furnace is below 2 mTorr, a mixture of Ar (95%) and $H_2$ (5%) is introduced until the pressure in the furnace is between 40 and 100 mTorr.

The temperature of the tube furnace is ramped at a rate of 20° C./min from room temperature until it reaches a temperature greater than 1000° C. The furnace is held at the final temperature for durations approaching 1 hr. After this time, the furnace is essentially shut off and allowed to cool down. Initial cool down rates are approximately 20° C./min.

Example 2: Comparison of Treated and Untreated Carbon Steel

Pieces of carbon steel were heated at temperatures between 800° C. and 1100° C. in the method described in Example 1. A Raman spectrum using a Renishaw InVia Raman spectroscopy system with a laser wavelength of 532 nm was taken on each piece of carbon steel. The "tell-tale" graphene Raman peaks of D ($1350\ cm^{-1}$), G ($1585\ cm^{-1}$) and 2D ($2700\ cm^{-1}$) were observed when the steel was heated above 800° C. (see FIG. 1). In FIG. 1, markers are added to aid the eye. Shifts in peak position may be due to picture formatting and are not necessarily indicating a change in phononic activity within the sample.

The D peak (aka the "defect" peak) in FIG. 1 decreased in amplitude while the 2D peak amplitude increased, which indicates an increase in graphene quality. The optimum temperature range for the process can be determined by following the decrease in amplitude in the D peak and increase in amplitude in the 2D peak.

Another characteristic of graphene is hydrophobicity; the physical property of a molecule wherein there is no attraction to water. FIG. 2 shows two pieces of carbon steel, pictures (b) and (c) compared to the hydrophobic activity of a leaf, picture (a)(Photo courtesy of Wikipedia). Water droplets become more spherical as the number of hydrophobic moieties increases. In the case of the leaf, it is completely covered in hydrophobic moieties and thus, the water droplet is nearly spherical. Water droplets on a piece of carbon steel heated to 800° C. in the above process show an ellipsoidal shape (2b). However, water on a piece of carbon steel heated to a more optimal temperature, 1050° C., has a much more spherical shape (2c). From this, it can be deduced that there are hydrophobic molecules present and that they cover substantially all of the object in question. Thus, the process of the present invention substantially covered the steel in nanoparticles of graphene.

Corrosion Resistance

The now coated carbon steel was then tested for corrosion resistance over a 10-day period. Five samples were prepared. The carbon steel samples were Techni-Edge™ utility knife blades purchased from McMaster-Carr™ supply company. The Techni-Edge™ blades are coated with an oily substance to prevent rust and corrosion. Sample MT-28-1 was an untreated blade from the package. The rust/corrosion inhibitor of Sample MT-28-2 was removed by a process of sonication with acetone. The other 3 samples (PW-76-1, -6, and -10) were subjected to the process of the present invention. Samples PW-76-1, -6, -10 were heated to 1050° C. for 1 hour.

All of the samples were immersed in a 5 molar saline solution during the test period. This level of salinity is nearly 10× the saline concentration of seawater. FIG. 3 shows the results of the corrosion test during the test and at the end of the test. Sample MT-28-2 had the highest level of visible corrosion and Sample PW1-76-1 (treated according to the present invention) had the least amount of corrosion. In this manner, the corrosion resistance of the process of the present invention is shown to be equal and in some cases, better than the corrosion resistant substance currently used by the knife blade manufacturer.

Example 3: General Procedure for Graphene Growth on a Growth Medium

The metal upon which it is desired to grow graphene (growth medium) and the carbon-containing metal seedsare brought together in a high temperature, extremely anaerobic atmosphere to grow graphene on the growth medium.

Seeds: The seeds are loaded with carbon to a level above 1 weight percent (wt %). For example, with Fe, the process of loading can be done with a commercial smelting process.

Sample: The seeds are then loaded onto the surface of the growth medium (e.g., Cu) to form a seed-coated growth medium or sample. The seeds are placed to allow the passage of a hydrogen-containing gas between the seeds.

Furnace Preparation: The sample is placed into the central heating zone of a tube furnace along with sufficient quantity (~70 cc for every liter of inner tube furnace volume) of Ti sponge (99.9% with topsize of 19 mm and minimum size below 3 mm). Care is taken to ensure that there is some small space in the furnace between the Ti sponge and sample. Typically, the samples and the Ti are in different crucibles or boats. When the vacuum in the furnace is below 2 mTorr, a mixture of Ar (95%) and $H_2$ (5%) is introduced until the pressure in the furnace is between 40 and 100 mTorr.

Graphene Formation: The temperature of the furnace is ramped at a rate of 20° C./min from room temperature until it reaches a temperature greater than 1000° C. The furnace is held at the final temperature for durations approaching 1 hr. After this time, the furnace is essentially shut off and cools down. Initial cooldown rates are approximately 20° C./min.

Further Graphene Production: Once the growth medium has cooled, the seeds can be brushed away from the surface. The growth medium can now be re-used in a chemical vapor deposition (CVD) or plasma vapor deposition (PVD) system to continue graphene growth from these growth domains. In this manner, the production of graphene can be more tightly controlled than the traditional thermodynamic process.

Example 4: Graphene Growth on a Growth Medium

Using the above procedure with similar temperatures (900° C. to 1000° C.) and similar growth times (1 hr) with Cu as the growth medium and Fe as the seeds, graphene was grown. The growth medium was examined by a Renishaw Invia Raman microscopy system with a laser wavelength of 532 nm was taken on each piece of carbon steel (see FIG. 4). Patterns of growth domains resembling "flowers" were found by visual inspection. These "flowers" or growth domains were interrogated by the Renishaw system. The "tell-tale" graphene Raman peaks of D (1350 $cm^{-1}$), G (1585 $cm^{-1}$) and 2D (2700 $cm^{-1}$) were observed when the laser targeted the growth domain. As show in FIG. 4, the 2D peak is approximately the same amplitude as the G peak indicating the growth domain is few layer (<6 layers) graphene.

FIGS. 5 and 6 show close up view of a number of growth domains and a single growth domain, respectively. In FIG. 5, distance varies between the domains between 10 μm to over 100 μm. In FIG. 6, a growth domain of 35 μm diameter is shown. These domains are not necessarily near the seeds placed on the growth medium but can be several hundred microns from any seeds.

Numerous modifications and variations of the present invention are possible in light of the above teachings. It is therefore to be understood that within the scope of the appended claims, the invention may be practiced otherwise that as specifically described herein.

We claim:

1. A method of forming graphene, comprising:
   (a) applying a vacuum to a furnace, the inside of the furnace comprising:
      A. an oxygen scavenger; and,
      B. a growth sample, the growth sample, comprising: a carbon-containing metal and a substrate, wherein the carbon-containing metal is in the form of a plurality of seeds that are in contact with the substrate;
   (b) introducing a hydrogen-containing gas to the furnace;
   (c) heating the inside of the furnace to a temperature and for a time sufficient to initiate graphene formation on the carbon-containing metal;
   (d) cooling the furnace; and
   (e) removing the seeds from the substrate.

2. The method of claim 1, wherein the carbon-containing metal is selected from: Fe and Ni.

3. The method of claim 1, wherein the carbon-containing metal is carbon steel.

4. The method of claim 1, wherein the carbon-containing metal is 1095 steel.

5. The method of claim 1, wherein the carbon-containing metal is grey steel.

6. The method of claim 1, wherein the substrate is selected from: Cu, sapphire, and Ni on sapphire.

7. The method of claim 1, wherein the substrate is Cu.

8. The method of claim 1, wherein the substrate is sapphire.

9. The method of claim 1, wherein the substrate is Ni on sapphire.

10. The method of claim 1, wherein the oxygen scavenger is Ti sponge.

11. The method of claim 1, wherein the vacuum applied is ≤10 mTorr.

12. The method of claim 1, wherein the vacuum applied is 2 mTorr.

13. The method of claim 1, wherein the hydrogen-containing gas is introduced until the pressure of the furnace is from 20-150 mTorr.

14. The method of claim 1, wherein the hydrogen-containing gas is a forming gas.

15. The method of claim 1, wherein the hydrogen-containing gas is 95% Ar/5% $H_2$.

16. The method of claim 1, wherein the hydrogen-containing gas is 95% $N_2$/5% $H_2$.

17. The method of claim 1, wherein the furnace is heated to a temperature of from 900-1100° C. for an hour.

18. The method of claim 1, wherein the furnace is maintained at its highest temperature for 30-60 minutes.

* * * * *